US011763803B1

(12) United States Patent
Griffiths et al.

(10) Patent No.: US 11,763,803 B1
(45) Date of Patent: Sep. 19, 2023

(54) SYSTEM, METHOD, AND COMPUTER PROGRAM FOR EXTRACTING UTTERANCES CORRESPONDING TO A USER PROBLEM STATEMENT IN A CONVERSATION BETWEEN A HUMAN AGENT AND A USER

(71) Applicant: ASAPP, Inc., New York, NY (US)

(72) Inventors: Michael Sebastian James Griffiths, New York, NY (US); Jessica Gammon Langdorf, Herndon, VA (US); Satchuthananthavale Rasiah Kuhan Branavan, Caterham (GB)

(73) Assignee: ASAPP, Inc., New York, NY (US)

( * ) Notice: Subject to any disclaimer, the term of this patent is extended or adjusted under 35 U.S.C. 154(b) by 82 days.

(21) Appl. No.: 17/387,978

(22) Filed: Jul. 28, 2021

(51) Int. Cl.
*G10L 15/16* (2006.01)
*G10L 15/22* (2006.01)
(Continued)

(52) U.S. Cl.
CPC .......... *G10L 15/16* (2013.01); *G10L 15/1815* (2013.01); *G10L 15/197* (2013.01); *G10L 15/22* (2013.01)

(58) Field of Classification Search
CPC ... G10L 15/16; G10L 15/1815; G10L 15/197; G10L 15/22
(Continued)

(56) References Cited

U.S. PATENT DOCUMENTS 5,649,060 A 7/1997 Ellozy et al.
7,003,462 B2 * 2/2006 Shambaugh ............ H04M 3/51
379/265.06
(Continued)

FOREIGN PATENT DOCUMENTS

CN 106569998 A 4/2017
WO 2019076866 4/2019

OTHER PUBLICATIONS

Lample et al., "Neural Architectures for Named Entity Recognition", In Proceedings of the North American Chapter of the Association for Computational Linguistics (NAACL), 2016.
(Continued)

*Primary Examiner* — Thuykhanh Le
(74) *Attorney, Agent, or Firm* — Lessani Law Group, PC (57) ABSTRACT

The present disclosure relates to a system, method, and computer program for extracting utterances corresponding to a user problem statement in a conversation between a human agent and a user. The system obtains a set of utterances from a natural language conversation between the human agent and the user. The system uses a problem-statement classifier to obtain machine-generated predictions as to whether each natural language utterance in the set relates to a problem statement. The system selects one or more utterances from the set as corresponding to a problem statement based on the predictions. The system provides the selected utterances to a downstream system for further processing. In certain embodiments, the problem statement classifier includes an encoder that creates an utterance embedding for each utterance and a prediction module that uses the utterance embeddings to predict whether each utterance corresponds to a user problem statement.

18 Claims, 3 Drawing Sheets

(51) Int. Cl.
*G10L 15/18* (2013.01)
*G10L 15/197* (2013.01)

(58) Field of Classification Search
USPC .................................................. 704/232
See application file for complete search history.

(56) References Cited

U.S. PATENT DOCUMENTS

| | | | |
|---|---|---|---|
| 7,502,741 B2 | 3/2009 | Finke et al. | |
| 7,633,551 B2 | 12/2009 | Sullivan | |
| 8,068,588 B2* | 11/2011 | Ramanathan | H04M 1/663 704/260 |
| 8,086,458 B2 | 12/2011 | Finke et al. | |
| 8,131,545 B1 | 3/2012 | Moreno et al. | |
| 8,230,343 B2 | 7/2012 | Logan et al. | |
| 8,289,366 B2 | 10/2012 | Greenwood et al. | |
| 8,620,663 B2* | 12/2013 | Kondo | G10L 13/08 704/260 |
| 8,665,863 B2* | 3/2014 | Silverman | H04M 3/5175 379/265.06 |
| 9,313,332 B1* | 4/2016 | Kumar | H04M 3/5166 |
| 10,375,237 B1* | 8/2019 | Williams | H04L 67/1036 |
| 10,528,866 B1 | 1/2020 | Dai et al. | |
| 10,554,817 B1 | 2/2020 | Sullivan et al. | |
| 10,572,534 B2 | 2/2020 | Readler | |
| 11,055,055 B1 | 7/2021 | Fieldman | |
| 11,106,442 B1 | 8/2021 | Hsiao et al. | |
| 11,138,970 B1 | 10/2021 | Han et al. | |
| 11,238,278 B1 | 2/2022 | Swanson et al. | |
| 11,487,944 B1 | 11/2022 | Yang et al. | |
| 11,521,639 B1* | 12/2022 | Shon | G06N 3/0895 |
| 2002/0116361 A1 | 8/2002 | Sullivan | |
| 2003/0084300 A1* | 5/2003 | Koike | H04L 63/10 713/182 |
| 2003/0154072 A1* | 8/2003 | Young | G06F 16/40 704/E15.045 |
| 2004/0002970 A1* | 1/2004 | Hur | G06F 16/951 |
| 2005/0117879 A1 | 6/2005 | Sullivan | |
| 2005/0151880 A1 | 7/2005 | Sullivan | |
| 2005/0222036 A1 | 10/2005 | During et al. | |
| 2007/0011012 A1 | 1/2007 | Yurick et al. | |
| 2007/0206881 A1 | 9/2007 | Ashikaga | |
| 2008/0092168 A1 | 4/2008 | Logan et al. | |
| 2008/0107255 A1* | 5/2008 | Geva | H04M 3/51 379/265.06 |
| 2010/0280828 A1* | 11/2010 | Fein | G10L 15/1822 704/E15.005 |
| 2011/0238408 A1* | 9/2011 | Larcheveque | G06F 40/211 704/9 |
| 2012/0140918 A1* | 6/2012 | Sherry | H04M 9/082 379/406.08 |
| 2012/0278071 A1 | 11/2012 | Garland et al. | |
| 2013/0039483 A1* | 2/2013 | Wolfeld | H04M 3/00 379/265.03 |
| 2013/0071837 A1 | 3/2013 | Winters-Hilt et al. | |
| 2013/0124984 A1 | 5/2013 | Kuspa | |
| 2013/0129071 A1* | 5/2013 | Teitelman | H04M 3/42221 379/265.06 |
| 2013/0144674 A1* | 6/2013 | Kim | G06Q 30/0267 705/7.19 |
| 2013/0191185 A1 | 7/2013 | Galvin | |
| 2014/0136443 A1* | 5/2014 | Kinsey, II | G06Q 30/0282 705/347 |
| 2014/0140497 A1* | 5/2014 | Ripa | H04M 3/5175 379/265.06 |
| 2014/0168354 A1* | 6/2014 | Clavel | H04N 7/152 348/14.09 |
| 2014/0229866 A1* | 8/2014 | Gottlieb | G06F 3/0486 709/204 |
| 2014/0241519 A1* | 8/2014 | Watson | H04M 3/5175 379/265.06 |
| 2014/0258872 A1* | 9/2014 | Spracklen | H04L 41/5067 715/736 |
| 2015/0106091 A1 | 4/2015 | Wetjen et al. | |
| 2015/0195220 A1* | 7/2015 | Hawker | H04L 51/216 707/723 |
| 2015/0235655 A1* | 8/2015 | Dimitriadis | G10L 25/48 704/270 |
| 2015/0278225 A1* | 10/2015 | Weiss | H04M 1/72457 705/14.58 |
| 2015/0281436 A1* | 10/2015 | Kumar | H04M 3/5166 379/68 |
| 2015/0281445 A1* | 10/2015 | Kumar | H04M 3/42221 379/88.01 |
| 2015/0286627 A1* | 10/2015 | Chang | G06F 40/205 704/9 |
| 2015/0341322 A1* | 11/2015 | Levi | G06Q 30/0269 726/26 |
| 2016/0078339 A1 | 3/2016 | Li et al. | |
| 2016/0088153 A1 | 3/2016 | Wicaksono et al. | |
| 2016/0117339 A1 | 4/2016 | Raskin et al. | |
| 2016/0173693 A1* | 6/2016 | Spievak | G06Q 30/0269 379/265.09 |
| 2016/0352907 A1* | 12/2016 | Raanani | H04M 3/5232 |
| 2016/0358321 A1 | 12/2016 | Xu et al. | |
| 2017/0062010 A1 | 3/2017 | Pappu et al. | |
| 2017/0187880 A1* | 6/2017 | Raanani | H04M 3/5175 |
| 2017/0300990 A1* | 10/2017 | Tanaka | G10L 15/08 |
| 2018/0007204 A1* | 1/2018 | Klein | H04M 3/5166 |
| 2018/0007205 A1* | 1/2018 | Klein | H04L 67/01 |
| 2018/0013699 A1 | 1/2018 | Sapoznik et al. | |
| 2018/0096271 A1* | 4/2018 | Raanani | G06N 20/00 |
| 2018/0124243 A1* | 5/2018 | Zimmerman | H04M 3/5133 |
| 2018/0130484 A1 | 5/2018 | Dimino, Jr. et al. | |
| 2018/0165554 A1 | 6/2018 | Zhang et al. | |
| 2018/0165723 A1* | 6/2018 | Wright | G06F 40/30 |
| 2018/0204111 A1 | 7/2018 | Zadeh et al. | |
| 2018/0301143 A1 | 10/2018 | Shastry et al. | |
| 2019/0065515 A1 | 2/2019 | Raskin et al. | |
| 2019/0103095 A1 | 4/2019 | Singaraju et al. | |
| 2019/0188590 A1 | 6/2019 | Wu et al. | |
| 2019/0189117 A1* | 6/2019 | Kumar | G06F 16/3329 |
| 2019/0190890 A1* | 6/2019 | Druker | G06F 21/6245 |
| 2019/0205748 A1 | 7/2019 | Fukuda et al. | |
| 2019/0236204 A1* | 8/2019 | Canim | G10L 15/16 |
| 2019/0251165 A1 | 8/2019 | Bachrach et al. | |
| 2019/0278942 A1* | 9/2019 | Baudart | G06F 40/295 |
| 2019/0287114 A1* | 9/2019 | Li | G06N 3/08 |
| 2020/0097820 A1 | 3/2020 | Song et al. | |
| 2020/0098370 A1* | 3/2020 | Arar | G10L 15/26 |
| 2020/0099790 A1* | 3/2020 | Ma | G06N 3/08 |
| 2020/0153969 A1* | 5/2020 | Dougherty | H04M 3/5231 |
| 2020/0184207 A1 | 6/2020 | Breslav | |
| 2020/0184278 A1 | 6/2020 | Zadeh et al. | |
| 2020/0218780 A1 | 7/2020 | Mei et al. | |
| 2020/0227026 A1* | 7/2020 | Rajagopal | G06F 16/244 |
| 2020/0242444 A1* | 7/2020 | Zhang | G06F 16/24522 |
| 2020/0265273 A1 | 8/2020 | Wei et al. | |
| 2020/0279567 A1* | 9/2020 | Adlersberg | G06F 40/35 |
| 2020/0344194 A1 | 10/2020 | Hosseinisianaki et al. | |
| 2021/0074260 A1 | 3/2021 | Gopala et al. | |
| 2021/0081613 A1 | 3/2021 | Begun et al. | |
| 2021/0081615 A1* | 3/2021 | McRitchie | G06F 40/247 |
| 2021/0089624 A1* | 3/2021 | Bealby-Wright | G10L 15/16 |
| 2021/0103720 A1* | 4/2021 | Kim | G06N 20/00 |
| 2021/0157834 A1* | 5/2021 | Sivasubramanian | G06F 16/686 |
| 2021/0233520 A1* | 7/2021 | Sar Shalom | G10L 15/063 |
| 2021/0233535 A1 | 7/2021 | Shir | |
| 2021/0256417 A1 | 8/2021 | Kneller et al. | |
| 2021/0295822 A1 | 9/2021 | Tomkins et al. | |
| 2021/0304019 A1* | 9/2021 | Anderson | G06F 9/451 |
| 2021/0304075 A1* | 9/2021 | Duong | G10L 15/22 |
| 2021/0304747 A1* | 9/2021 | Haas | G10L 15/22 |
| 2021/0304769 A1 | 9/2021 | Ye et al. | |
| 2021/0319481 A1* | 10/2021 | Maheswaran | G06Q 30/0281 |
| 2022/0093101 A1* | 3/2022 | Krishnan | G10L 15/20 |
| 2022/0094789 A1* | 3/2022 | Lau | G10L 15/26 |
| 2022/0197306 A1* | 6/2022 | Celia | B33Y 10/00 |
| 2022/0198229 A1 | 6/2022 | Onate et al. | |
| 2022/0300885 A1* | 9/2022 | Yannam | G06Q 10/063114 |

(56) References Cited

U.S. PATENT DOCUMENTS

| | | | | |
|---|---|---|---|---|
| 2022/0319514 | A1* | 10/2022 | Hosomi | G06F 18/285 |
| 2022/0383867 | A1* | 12/2022 | Faulkner | H04M 3/42221 |
| 2022/0391233 | A1* | 12/2022 | Decrop | H04L 65/403 |
| 2022/0394348 | A1* | 12/2022 | Hatambeiki | H04N 21/44218 |
| 2022/0398598 | A1* | 12/2022 | Das | G06F 40/284 |

OTHER PUBLICATIONS

Lei, Tao et al., "Rationalizing Neural Predictions", Proceedings of the 2016 Conference on Empirical Methods in Natural Language Processing, pp. 107-117, Nov. 2016.

Lei, Tao et al., "Simple Recurrent Units for Highly Parallelizable Recurrence", Proceedings of the Conference on Empirical Methods in Natural Language Processing, 2018.

Li, P., et al. "An Attention Pooling based Representation Learning Method for Speech Emotion Recognition," Proc. Interspeech 2018, pp. 3087-3091.

Li, R., et al. "Dilated Residual Network with Multi-Head Self-Attention for Speech Emotion Recognition," In ICASSP 2019-2019 IEEE International Conference on Acoustics, Speech and Signal Processing (ICASSP), IEEE, 2019, pp. 6675-6679.

Li et al., "Efficient Hyperparameter Optimization and Infinitely Many Armed Bandits", CoRR, 2016.

Li, Jiwei et al., "Understanding Neural Networks through Representation Erasure", 2016.

Lin, Bingqian et al., "Jointly Deep Multi-View Learning for Clustering Analysis", arXiv preprint arXiv:1808.06220, 2018.

Lin, Junyang et al., "Learning When to Concentrate or Divert Attention: Self-Adaptive Attention Temperature for Neural Machine Translation", Proceedings of the 2018 Conference on Empirical Methods in Natural Language Processing, pp. 2985-2990, Nov. 2018.

Linton, Ian "How to Make a Customer Service Process Flowchart", Sep. 26, 2017, pp. 1-8.

Liu, Y., et al. "RoBERTa: A Robustly Optimized BERT Pretraining Approach," 2019.

Logeswaran, Lajanugen et al., "An Efficient Framework for Learning Sentence Representations", In Proceedings of the International Conference on Learning Representations (ICLR) 2018.

Lu, Z., et al. "Speech Sentiment Analysis via Pre-trained Features from End-to-End ASR Models," In ICASSP 2020-2020 IEEE International Conference on Acoustics, Speech and Signal Processing (ICASSP), IEEE, 2020, pp. 7149-7153.

Lugosch, L., et al. "Speech Model Pre-training for End-to-End Spoken Language Understanding," 2019, pp. 814-818.

Martins, Andre F.T., et al., "From Softmax to Sparsemax: A Sparse Model of Attention and Multi-Label Classification", 2016.

Mintz et al., "Distant Supervision for Relation Extraction Without Labeled Data", In Proceedings of the Association for Computational Linguistics (ACL), 2009.

Mirsamadi, S., et al. "Automatic Speech Emotion Recognition Using Recurrent Neural Networks with Local Attention," In 2017 IEEE International Conference on Acoustics, Speech and Signal Processing (ICASSP), pp. 2227-2231.

Mohammad, S. "A Practical Guide to Sentiment Annotation: Challenges and Solutions," In Proceedings of the 7th Workshop on Computational Approaches to Subjectivity, Sentiment and Social Media Analysis, 2016, pp. 174-179.

Mrkšić, Nikola et al., "Multi-Domain Dialog State Tracking Using Recurrent Neural Networks", In Proceedings of the Association for Computational Linguistics (ACL) 2015.

Parikh, Ankur P., et al., "A Decomposable Attention Model for Natural Language Inference", 2016.

Pennington et al., "GloVe: Global Vectors for Word Representation", In Proceedings of Empirical Methods for Natural Language Processing (EMNLP), 2014.

Peyré, Gabriel et al., "Computational Optimal Transport", Foundations and Trends in Machine Learning, vol. 11, No. 5-6, pp. 355-607, 2019.

Quattoni et al., "Conditional Random Fields for Object Recognition", In Advances in Neural Information Processing Systems, 2005.

Rabiner, Lawrence R., "A Tutorial on Hidden Markov Models and Selected Applications in Speech Recognition", Proceedings of the IEEE, 1989.

Sadikov, Eldar et al., "Clustering Query Refinements by User Intent", In Proceedings of the International Conference on World Wide Web, 2010.

Sanh, V., et al. "DistilBERT, a Distilled Version of BERT: Smaller, Faster, Cheaper and Lighter," 2019.

Shah, Darsh et al., "Adversarial Domain Adaptation for Duplicate Question Detection", In Proceedings of Empirical Methods for Natural Language Processing (EMNLP) 2018.

Sinkhorn, Richard et al., "Concerning Nonnegative Matrices and Doubly Stochastic Matrices", Pacific Journal of Mathematics, vol. 21, No. 2, pp. 343-348, 1967.

Siriwardhana, S., et al. "Jointly Fine-Tuning "BERT-like" Self Supervised Models to Improve Multimodal Speech Emotion Recognition," Proc. Interspeech 2020, pp. 3755-3759.

Snell, Jake et al., "Prototypical Networks for Few-Shot Learning", In Neural Information Processing Systems (NIPS) 2017.

Stubbs et al., "Annotating Longitudinal Clinical Narratives for De-identification: The 2014 i2b2/UTHealth Corpus", Journal of Biomedical Informatics, 2015.

Tian et al., "Contrastive Representation Distillation", In Proceedings of the International Conference on Learning Representations (ICLR), 2020.

Tzeng et al., "Adversarial Discriminative Domain Adaptation", In Proceedings of the IEEE Conference on Computer Vision and Pattern Recognition, 2017.

Venkatesan et al., "A Novel Progressive Learning Technique for Multi-class Classification", Neurocomputing, 2016.

Wiegreffe, Sarah et al., "Attention is not not Explanation", 2019.

Williams, Jason, "A Belief Tracking Challenge Task for Spoken Dialog Systems", In Proceedings of the NAACL-HLT Workshop on Future Directions and Needs in the Spoken Dialog Community, 2012.

Williams, Jason et al., The Dialog State Tracking Challenge, In Proceedings of the SIGDIAL Conference, 2013.

Wolf, T., et al. "Transformers: State-of-the-Art Natural Language Processing," 2019.

Wu, X., et al. "Speech Emotion Recognition Using Capsule Networks," In ICASSP, IEEE International Conference on Acoustics, Speech and Signal Processing (ICASSP). IEEE, 2019, pp. 6695-6699.

Xie, Qizhe et al., "An Interpretable Knowledge Transfer Model for Knowledge Base Completion", 2017.

Xie, Y., et al. "Speech Emotion Classification Using Attention-Based LSTM," IEEE/ACM Transactions on Audio, Speech, and Language Processing, vol. 27, No. 11, pp. 1675-1685, 2019.

Xie, Junyuan et al., "Unsupervised Deep Embedding for Clustering Analysis", In Proceedings of the International Conference on Machine Learning (ICML) 2016.

Xu, Hongteng et al., "Gromov-Wasserstein Learning for Graph Matching and Node Embedding", Proceedings of the 36th International Conference on Machine Learning, 2019.

Yang, Bo et al., "Towards k-means-friendly Spaces: Simultaneous Deep Learning and Clustering", In Proceedings of the International Conference on Machine Learning (ICML) 2016.

Yang, Z., et al. "XLNET: Generalized Autoregressive Pretraining for Language Understanding," 33rd Conference on Neural Information Processing Systems, 2019.

Yang et al., "Design Challenges and Misconceptions in Neural Sequence Labeling", In Proceedings of the 27th International Conference on Computational Linguistics (COLING), 2018.

Yih et al., "Semantic Parsing via Staged Query Graph Generation: Question Answering with Knowledge Base", In Proceedings of the Association for Computational Linguistics (ACL), 2015.

(56) References Cited

OTHER PUBLICATIONS

Yu, Mo et al., "Rethinking Cooperative Rationalization: Introspective Extraction and Complement Control", Proceedings of the 2019 Conference on Empirical Methods in Natural Language Processing, 2019.

Zadeh, A., et al. "Multimodal Language Analysis in the Wild: CMU-MOSEI Dataset and Interpretable Dynamic Fusion Graph," In Proceedings of the 56th Annual Meeting of the Association for Computational Linguistics (vol. 1: Long Papers), 2018, pp. 2236-2246.

Alvarez-Melis, David et al., "Towards Robust Interpretability with Self-Explaining Neural Networks", 32nd Conference on Neural Information Processing Systems, 2018.

Alvarez-Melis, David et al., "Gromov-Wasserstein Alignment of Word Embedding Spaces", Proceedings of the 2018 Conference on Empirical Methods in Natural Language Processing, pp. 1881-1890, Nov. 2018.

Bahdanau, Dzmitry et al., "Neural Machine Translation by Jointly Learning to Align and Translate", International Conference on Learning Representations, 2015.

Bastings, Jasmijn et al., "Interpretable Neural Predictions with Differentiable Binary Variables", Proceedings of the 57th Annual Meeting of the Association for Computational Linguistics, pp. 2963-2977, Aug. 2019.

Bellare et al., "Learning Extractors from Unlabeled Text using Relevant Databases", In Sixth International Workshop on Information Integration on the Web, 2007.

Beryozkin et al., "A Joint Named-Entity Recognizer for Heterogeneous Tag sets Using a Tag Hierarchy", In Proceedings of the Association for Computational Linguistics (ACL), 2019.

Bickel, Steffen et al., "Multi-View Clustering", In Proceedings of the IEEE International Conference on Data Mining (ICDM) 2004.

Blitzer et al., "Domain Adaptation with Structural Correspondence Learning", In Proceedings of Empirical Methods for Natural Language Processing (EMNLP), 2006.

Bojanowski, Piotr, et al., "Enriching Word Vectors with Subword Information", Transactions of the Association for Computational Linguistics, vol. 5, pp. 135-146, 2017.

Bucilua et al., "Model Compression", In Proceedings of Knowledge Discovery and Data Mining (KDD), 2006.

Budzianowski, Pawel, et al., "MultiWOZ—A Large-Scale Multi-Domain Wizard-of-Oz Dataset for Task-Oriented Dialogue Modelling", In Proceedings of Empirical Methods for Natural Language Processing (EMNLP) 2018.

Chang, Shiyu et al., "A Game Theoretic Approach to Class-wise Selective Rationalization", In Advances in Neural Information Processing Systems, 2019.

Chaudhuri, Kamalika et al., "Multi-View Clustering via Canonical Correlation Analysis", In Proceedings of the International Conference on Machine Learning (ICML) 2009.

Chen et al., "Transfer Learning for Sequence Labeling Using Source Model and Target Data", In Proceedings of the National Conference on Artificial Intelligence (AAAI), 2019.

Chen, Jianbo et al., "Learning to Explain: An Information-Theoretic Perspective on Model Interpretation", Proceedings of the 35th International Conference on Machine Learning, 2018.

Chen, Liqun et al., "Adversarial Text Generation via Feature-Mover's Distance", 32nd Conference on Neural Information Processing Systems, 2018.

Cheung, Jackie Chi Kit et al., "Sequence Clustering and Labeling for Unsupervised Query Intent Discovery", In Proceedings of the ACM International Conference on Web Search and Data Mining (WSDM) 2012.

Cho, J., et al. "Deep Neural Networks for Emotion Recognition Combining Audio and Transcripts," Proc. Interspeech 2018, pp. 247-251.

Cieri, C., et al. "The Fisher Corpus: a Resource for the Next Generations of Speech-to-Text" In LREC, vol. 4, 2004, pp. 69-71.

Ciresan, Dan et al., "Multi-col. Deep Neural Networks for Image Classification", In IEEE Conference on Computer Vision and Pattern Recognition, 2012.

Cuturi, Marco "Sinkhorn Distances: Lightspeed Computation of Optimal Transportation Distances", In Advances in Neural Information Processing Systems, pp. 2292-2300, 2013.

David et al., "Analysis of Representations for Domain Adaptation", In Neural Information Processing Systems (NIPS), 2007.

Deepak, Padmanabhan "Mixkmeans: Clustering Question-Answer Archives", In Proceedings of Empirical Methods for Natural Language Processing (EMNLP) 2016.

Devlin, J., et al. "BERT: Pre-training of Deep Bidirectional Transformers for Language Understanding," 2018.

Ganin et al., "Unsupervised Domain Adaptation by Backpropagation", In Proceedings of the International Conference on Machine Learning (ICML), 2015.

Glorot et al., "Domain Adaptation for Large-Scale Sentiment Classification: A Deep Learning Approach", In Proceedings of the International Conference on Machine Learning (ICML), 2011.

Greenberg et al., "Marginal Likelihood Training of BiLSTM-CRF for Biomedical Named Entity Recognition from Disjoint Label Sets", In Proceedings of Empirical Methods for Natural Language Processing (EMNLP), 2018.

Haghani, P., et al. "From Audio to Semantics: Approaches to End-to-End Spoken Language Understanding," In 2018 IEEE Spoken Language Technology Workshop (SLT), IEEE, 2018, pp. 720-726.

Han, K. J., et al. "Multistream CNN for Robust Acoustic Modeling," 2020.

Haponchyk, Iryna et al., "Supervised Clustering of Questions into Intents for Dialog System Applications", In Proceedings of Empirical Methods for Natural Language Processing (EMNLP) 2018.

Harvard Business Review Analytic Services, "Real Time Analytics", Harvard Business Review, Jun. 4, 2018.

Hemphill, Charles T., et al., "The Atis Spoken Language Systems Pilot Corpus", In Proceedings of the Workshop on Speech and Natural Language, 1990.

Henderson, Matthew et al., "The Second Dialog State Tracking Challenge", In Proceedings of the Annual Meeting of the Special Interest Group on Discourse and Dialogue (SIGDIAL) 2014.

Henderson, Matthew et al., "Word-Based Dialog State Tracking with Recurrent Neural Networks", In Proceedings of the 15th Annual Meeting of the Special Interest Group on Discourse and Dialogue (SIGDIAL) 2014.

Hinton et al., "Distilling the Knowledge in a Neural Network", 2015.

Hooker, Andrew "Improving the State Machine of Your Business", Nov. 15, 2018, pp. 1-11.

Huang et al., "Learning a Unified Named Entity Tagger From Multiple Partially Annotated Corpora For Efficient Adaptation", In Proceedings of the Conference on Natural Language Learning (CoNLL), 2019.

Jain, Sarthak et al., "Attention is not Explanation", 2019.

Jansen, Bernard et al., "Classifying the User Intent of Web Queries Using k-means Clustering", Internet Research, vol. 20, No. 5, 2010.

Jeon, Jiwoon, "Finding Similar Questions in Large Question and Answer Archives", In Proceedings of the ACM International Conference on Information and Knowledge Management (CIKM) 2005.

Jie et al., "Better Modeling of Incomplete Annotations for Named Entity Recognition", In Proceedings of the North American Chapter of the Association for Computational Linguistics (NAACL), 2019.

Kanaan-Izquierdo, Samir et al., "Multiview and Multifeature Spectral Clustering Using Common Eigenvectors", Pattern Recognition Letters, 102, 2018.

Kim, E., et al. "DNN-Based Emotion Recognition Based on Bottleneck Acoustic Features and Lexical Features," In ICASSP 2019-2019 IEEE International Conference on Acoustics, Speech and Signal Processing (ICASSP), IEEE, 2019, pp. 6720-6724.

Kim, Seokhwan et al., "The Fifth Dialog State Tracking Challenge", In Proceedings of the IEEE Spoken Language Technology Workshop (SLT) 2016.

(56) References Cited

OTHER PUBLICATIONS

Kim et al., "Sequence-Level Knowledge Distillation", In Proceedings of Empirical Methods for Natural Language Processing (EMNLP), 2016.
Kim, S., et al. "Joint CTC-Attention Based End-to-End Speech Recognition Using Multi-Task Learning," In 2017 IEEE International Conference on Acoustics, Speech and Signal Processing (ICASSP), IEEE, 2017, pp. 4835-4839.
Kumar, Abhishek et al., "Co-regularized Multi-View Spectral Clustering", In Neural Information Processing Systems (NIPS) 2011.
Kuo, et al. "End-to-End Spoken Language Understanding Without Full Transcripts," 2020.
Kusner, Matt J., et al., "From Word Embeddings To Document Distances", Proceedings of the 32nd International Conference on Machine Learning, vol. 37, ICML'15, pp. 957-966, JMLR.org, 2015.
Lafferty et al., "Conditional Random Fields: Probabilistic Models for Segmenting and Labeling Sequence Data", In Proceedings of the International Conference on Machine Learning (ICML), 2001.

\* cited by examiner

SYSTEM, METHOD, AND COMPUTER PROGRAM FOR EXTRACTING UTTERANCES CORRESPONDING TO A USER PROBLEM STATEMENT IN A CONVERSATION BETWEEN A HUMAN AGENT AND A USER

BACKGROUND OF THE INVENTION

1. Field of the Invention

This invention relates generally to user-agent interaction systems and, more specifically, to a system and method for extracting utterances corresponding to a user problem statement in a conversation between a human agent and a user, where the user problem statement is extracted for purposes of downstream processing in a user-agent interaction system.

2. Description of the Background Art

The majority of organizations, such as government, business, medical, and educational entities, etc., use some form of user-agent interaction systems to increase efficiency, reduce overhead costs, and minimize the human resources required to run the organization. In setting up a user-agent interaction system, many organizations use data collected by an interactive voice recognition (IVR) system to determine the range of user problems, compile reports and analysis for such problems, and use the reports and analysis in various downstream processes. Some users, however, are quite savvy and know that they can bypass the IVR system and speak to a human agent by speaking a key word such as "agent" or "representative," in which case, the user is directly connected to a human agent, but the IVR system obtains erroneous or irrelevant data related to the user problem statement. The users who bypass the IVR system, however, still need to provide a user problem statement to the human agent upon connection so that the human agent can provide the necessary assistance. Therefore, there is a need for a system and method that can extract utterances corresponding to a user problem statement in the conversation between the human agent and the user, where the user problem statement is extracted for purposes of downstream processing in the user-agent interaction system.

SUMMARY OF THE DISCLOSURE

The present disclosure describes a system, method, and computer program for extracting utterances corresponding to a user problem statement in a conversation between a human agent and a user, where the user problem statement is extracted for purposes of downstream processing in a user-agent interaction system. The method is performed by a computer system that includes servers, storage systems, networks, operating systems, and databases.

Unlike the typical interactive voice recognition (IVR) systems that collects user problem statements during the interaction between the user and the IVR system, the present invention extracts utterances corresponding to a user problem statement in a conversation between a human agent and a user. This is more challenging from a technical perspective. An IVR system typically prompts the user to provide his or her problem statement, so the system knows that whatever the user responds after the prompt would be considered the user problem statement. In the present invention, however, the conversation between the human agent and the user may not be standardized, so it may not be as readily apparent which utterance(s) is(are) the user problem statement. Instead, audio or text utterances (or a text transcription) are obtained from a natural language conversation between a human agent and a user, and a problem statement classifier is used to obtain machine-generated predictions as to whether each natural language utterance relates to a problem statement. In certain embodiments, the problem statement classifier includes an encoder that creates an utterance embedding for each utterance and a prediction module that uses the utterance embeddings to predict whether each utterance corresponds to a user problem statement.

In one embodiment, a method for extracting utterances corresponding to a user problem statement in a conversation between a human agent and a user, where the user problem statement is extracted for purposes of downstream processing in a user-agent interaction system, comprises the following steps:

obtaining a set of utterances from a natural language conversation between a human agent and a user;

using a problem-statement classifier to obtain machine-generated predictions as to whether each natural language utterance in the set relates to a problem statement;

selecting one or more utterances from the set as corresponding to a problem statement based on the predictions; and providing the selected utterances to a downstream system for further processing.

DETAILED DESCRIPTION OF THE PREFERRED EMBODIMENTS

The present disclosure describes a system, method, and computer program for extracting utterances corresponding to a user problem statement in a conversation between a human agent and a user, where the user problem statement is extracted for purposes of downstream processing in a user-agent interaction system. The method is performed by a computer system that includes servers, storage systems, networks, operating systems, and databases ("the system").

The present invention relates to a system, method, and computer program for extracting utterances corresponding to a user problem statement in a conversation between a human agent and a user. The system obtains a set of utterances from a natural language conversation between a human agent and a user. The system uses a problem-statement classifier to obtain machine-generated predictions as to whether each natural language utterance in the set relates to a problem statement. The classifier is trained using a training data set that has utterances that are annotated as being part of a problem statement or not part of a problem statement. The system selects one or more utterances from the set as corresponding to a problem statement based on the predictions. The system provides the selected utterances to a downstream system for further processing.

Figure 1:
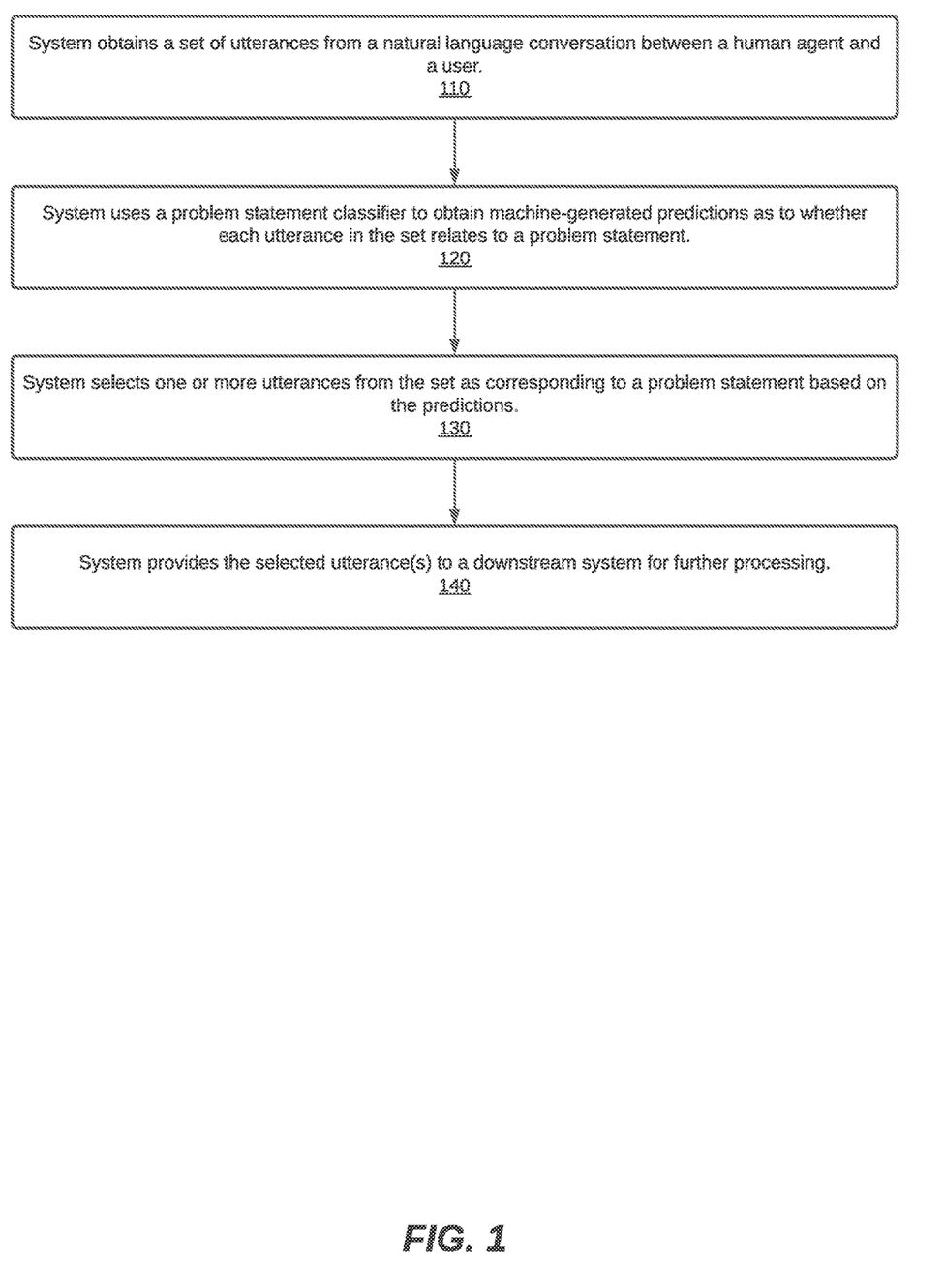
FIG. 1 is a flowchart that illustrates a method, according to one embodiment, for extracting utterances corresponding to a user problem statement in a conversation between a human agent and a user.

1. Method for Extracting Utterances Corresponding to a User Problem Statement in a Conversation Between a Human Agent and a User FIG. 1 illustrates a method for extracting utterances corresponding to a user problem statement in a conversation between a human agent and a user, where the user problem statement is extracted for purposes of downstream processing in a user-agent interaction system. The user may be a customer, a prospective customer, a patient, an employee, etc. A person skilled in the art would understand that the type of user may vary within the scope of the present invention. In the example where the user is a customer, the user-agent interaction system would be a customer service system.

The system obtains a set of utterances from a natural language conversation between the human agent and the user (step 110). The utterances may contain a few words (e.g., one to three words) or they may contain many words (e.g., 20 words or more). In certain embodiments, the set of utterances are audio utterances. In certain embodiments, the set of utterances are text utterances. In certain embodiments, the set of utterances are audio utterances that are converted to text transcriptions by means of an audio speech recognition system. In certain embodiments, the set of utterances are from the first n seconds of the conversation between the human agent and the user (where n is a positive integer). In one example, n is 60 seconds. In certain embodiments, the set of text utterances are from the first n user turns in the conversation between the human agent and the user (where n is a positive integer). In one example, n is 5 user turns.

The system uses a problem statement classifier to obtain machine-generated predications as to whether each natural language utterance (i.e., audio utterance, text utterance, or text transcription) in the set relates to a problem statement (step 120). In certain embodiments, the problem statement classifier includes an encoder that creates an utterance embedding for each utterance and a prediction module that uses the utterance embeddings to predict whether each utterance corresponds to a user problem statement. An utterance embedding is a vector representation of the utterance (i.e., representing the utterance as a set of coordinates, or numerical values, in space). When the utterance embeddings for each utterance are plotted in space, the utterance embeddings of similar utterances appear close to one another and the utterance embeddings from dissimilar utterances appear further apart. This results in clusters of utterances that are similar to one another. The clusters may be further refined based on an analysis of the context. The clusters are used by the prediction module to make predictions on whether an utterance corresponds to a user problem statement.

In certain embodiments, the encoder is a neural network encoder. In one example, the neural network encoder is a pretrained Simple Recurrent Unit (SRU), which is described in U.S. Patent Publication No. 2019/0122101 A1 and in Perkins, Hugh, et al. "Dialog Intent Induction with Deep Multi-View Clustering." *Proceedings of the 2019 Conference on Empirical Methods in Natural Language Processing and the 9th International Joint Conference on Natural Language Processing*, 3-7 Nov. 2019, pp. 4016-4025, which are incorporated by reference as if fully disclosed herein. In certain embodiments, the encoder creates an utterance embedding by creating a Term Frequency-Inverse Document Frequency (TF-IDF) vector for each utterance, such that the collection of utterances forms a matrix. TF-IDF is a measure of originality of a word by comparing the number of times a word appears in a document with the number of documents (in a set of documents) the word appears in. In certain embodiments, the TF-IDF vector is created by applying a TF-IDF vectorizer algorithm to one or more n-grams of the utterance (where n is a positive integer). An n-gram is a contiguous sequence of n items from a given sample of text or speech. In one example, n has a range from one to three. A person skilled in the art would understand that other encoders may be used within the scope of the present invention. In certain embodiments, the prediction module uses logistic regression to make the predictions. In certain embodiments, the prediction module is a feed-forward neural network. A person skilled in the art would understand that other prediction modules may be used within the scope of the present invention.

In certain embodiments, the utterance embedding is based on the utterance and one or more context features. In other words, if the encoder is a neural network encoder, then the neural network encoder may create an utterance embedding based on the utterance and one or more context features. Similarly, if the encoder creates an utterance embedding as a TF-IDF vector, then the TF-IDF embedding may be based on the utterance and one or more context features. Examples of context features for an utterance embedding include: an utterance index value, all of the user words up to the time of the utterance, all of the agent words up to the time of the utterance, and a value indicative of whether the utterance is an agent prompt. In certain embodiments, these context features are additional input to the encoder (in addition to the utterance). In certain embodiments, the context features are concatenated to the utterance embedding. For example, an orthogonal polynomial with these feature values may be concatenated to the TF-IDF vector for the utterance. An agent-prompt classifier (i.e., a classifier trained to predict whether an utterance is an agent prompt) may be applied to the TF-IDF vector in order to identify which of the utterances in the set are agent prompts.

The system selects one or more utterances from the set as corresponding to a problem statement based on the predictions (step 130). In certain embodiments, selecting one or more utterances from the set as corresponding to a problem statement based on the predictions includes filtering out utterances corresponding to the human agent and identifying one or more user utterances having a greater-than-a threshold probability of corresponding to a problem statement. In one example, the threshold probability is 50%. A person skilled in the art would understand that the threshold can be higher or lower based on what would be optimal for the system. In certain embodiments, in response to the identified user utterances exceeding k number of utterances, the system selects the k utterances with the greatest probability of corresponding to a problem statement (where k is an integer greater than one). In one example, the value of k is two.

The system provides the selected utterance(s) to a downstream system for further processing (step 140). Examples of downstream systems include: an intent classifier, a sentiment classifier, a novelty detection system that detects novel user issues, a user intent discovery system that identifies new user intents, a handle time prediction system that predicts a handle time for each user call, etc. For example, if the handle time is longer (in the case of more complex or time-intensive issues), a supervisor or administrator of the user-agent interaction system is notified and encouraged to provide assistance to the human agents handling such issues. In certain embodiments, the downstream system is a user interface, and the selected utterance(s) are displayed in the user interface for an administrator to review and take action as needed. The downstream system may also be a user interface that displays proposed agent responses or other options based on the selected utterance(s) to a human agent. In certain embodiments, the downstream system uses the selected utterance(s) for conversation summaries, topic modeling, as a pass through, etc. In certain embodiments, the downstream system is used for flex concurrency. For example, in a system where agents handle more than one conversation at a time, the problem statements may be used to determine how many more conversations an agent would be able to handle.

2. Example System Architecture

Figure 2A:
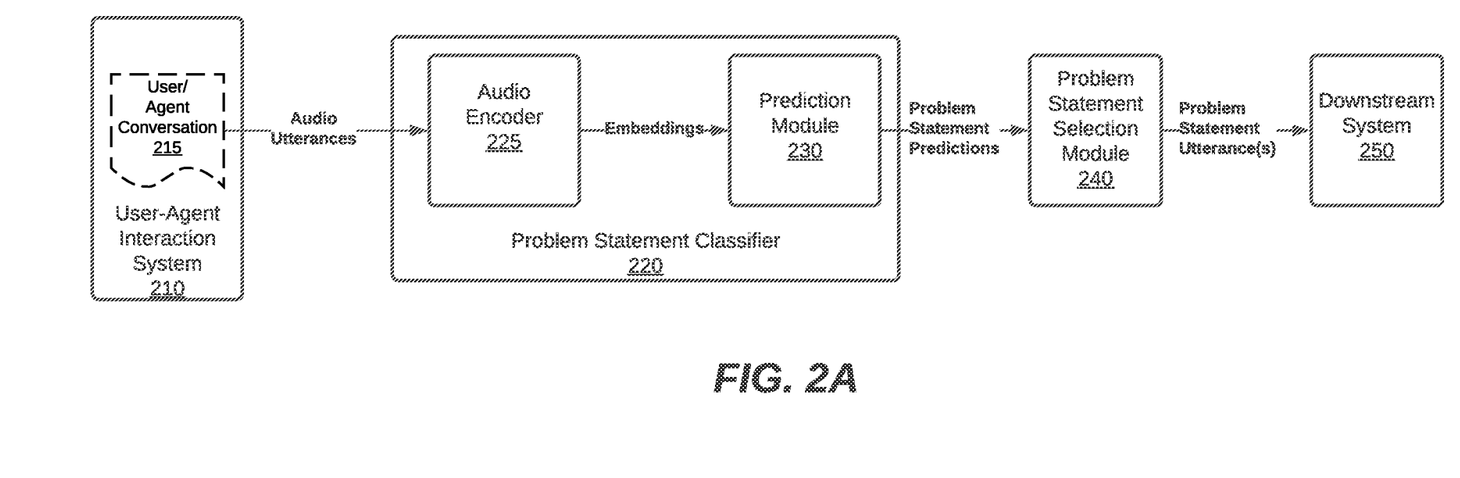
FIGS. 2A-2C are block diagrams that illustrate an example software architecture according to certain embodiments.
Figure 2B:
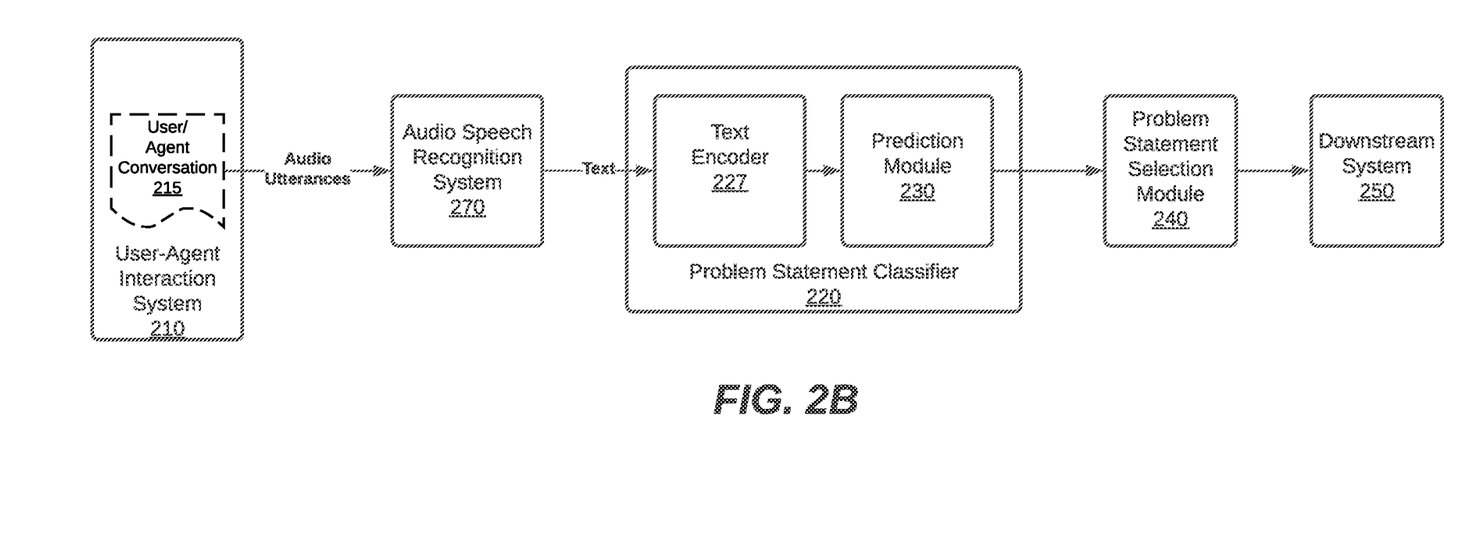
Figure 2C:
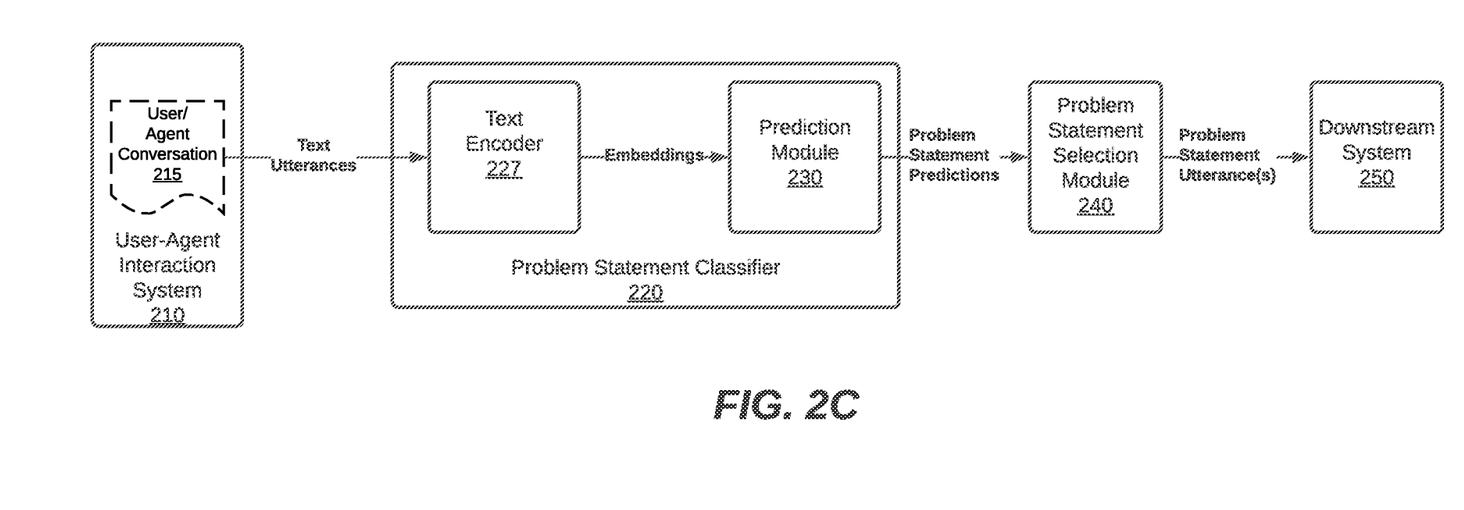

FIGS. 2A-2C illustrate example architectures for a system that performs the method described herein. However, the method described herein may be implemented in other systems and is not limited to the illustrated systems. FIG. 2A shows a user-agent interaction system 210 that processes a user/agent conversation 215. In this case, the user/agent conversation 215 takes the form of audio utterances that are sent to the problem statement classifier 220. The problem statement classifier includes an audio encoder 225 that converts the audio utterances into utterance embeddings, which are sent to a prediction module 230. The prediction module 230 uses the utterance embeddings to obtain machine-generated problem statement predictions (i.e., whether each utterance corresponds to a user problem statement), which are sent to a problem statement selection module 240. The problem statement selection model 240 selects one or more utterances as corresponding to a problem statement based on the predictions of the prediction module 230. The selected problem statement utterance(s) are then sent to a downstream system 250 for further processing.

FIG. 2B is similar to FIG. 2A, but instead of the audio utterances being sent directly to a problem statement classifier 220, they are sent to an audio speech recognition system 270 that transcribes the audio utterances into text transcriptions. The text transcriptions are then sent to a text encoder 227 within the problem statement classifier 220, which converts the text transcriptions into utterance embeddings, which are sent to a prediction module 230. FIG. 2C is also similar to FIG. 2A, but the user/agent conversation 215 takes the form of text utterances that are sent to a text encoder 227 within the problem statement classifier 220, which converts the text utterances into utterance embeddings, which are sent to a prediction module 230. The rest of the systems illustrated in FIGS. 2B and 2C function similarly to the system illustrated in FIG. 2A.

3. General

The methods described with respect to FIGS. 1-2C are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for extracting utterances corresponding to a user problem statement in a conversation between a human agent and a user, wherein the user problem statement is extracted for purposes of downstream processing in a user-agent interaction system, the method comprising:
   obtaining a set of utterances from a natural language conversation between a human agent and a user;
   using a problem-statement classifier to obtain machine-generated predictions as to whether each natural language utterance in the set of utterances relates to a problem statement;
   selecting one or more utterances from the set of utterances as corresponding to a problem statement based on the predictions, wherein selecting one or more utterances from the set of utterances as corresponding to a problem statement based on the predictions comprises:
      filtering out one or more utterances from the set of utterances corresponding to the human agent, and
      identifying one or more user utterances from the set of utterances having a greater-than-a threshold probability of corresponding to a problem statement,
      wherein, in response to the identified user utterances exceeding k number of utterances, selecting the k utterances with the greatest probability of corresponding to a problem statement, wherein k is an integer greater than one; and
   providing the selected utterances to a downstream system for further processing.

2. The method of claim 1, wherein the problem statement classifier includes an encoder that creates an utterance embedding for each utterance and a prediction module that uses the utterance embeddings to predict whether each utterance corresponds to a user problem statement.

3. The method of claim 2, wherein the utterance embedding is based on the utterance and one or more context features.

4. The method of claim 3, wherein the context features are additional input to the encoder, or the context features are concatenated to the utterance embedding.

5. The method of claim 2, wherein the encoder is a neural network encoder.

6. The method of claim 5, wherein the neural network encoder is a pretrained Simple Recurrent Unit (SRU).

7. The method of claim 2, wherein the encoder creates an utterance embedding by creating a TF-IDF vector for each utterance.

8. The method of claim 7, wherein the TF-IDF vector is created by applying a TF-IDF vectorizer algorithm to one or more n-grams of the utterance, wherein the one or more n-grams include an indicator of whether the utterance is from the human agent or the user, wherein n is a positive integer.

9. The method of claim 2, wherein the prediction module uses logistic regression to make the predictions.

10. The method of claim 2, wherein the prediction module is a feed-forward neural network.

11. The method of claim 1, wherein the utterances are audio utterances, and wherein an automatic speech recognition system converts the audio utterances to text transcriptions, and the text transcriptions of the utterances are inputted into the problem-statement classifier.

12. The method of claim 1, wherein the set of utterances are from the first n seconds of the conversation between the human agent and the user, wherein n is a positive integer.

13. The method of claim 1, wherein the downstream system is an intent classifier.

14. The method of claim 1, wherein the downstream system is a sentiment classifier.

15. The method of claim 1, wherein the downstream system is a novelty detection system that detects novel user issues.

16. A computer system for extracting utterances corresponding to a user problem statement in a conversation between a human agent and a user, wherein the user problem statement is extracted for purposes of downstream processing in a user-agent interaction system, the system comprising:
  one or more processors;
  one or more memory units coupled to the one or more processors, wherein the one or more memory units store instructions that, when executed by the one or more processors, cause the system to perform the operations of:
    obtaining a set of utterances from a natural language conversation between a human agent and a user;
    using a problem-statement classifier to obtain machine-generated predictions as to whether each natural language utterance in the set of utterances relates to a problem statement;
    selecting one or more utterances from the set of utterances as corresponding to a problem statement based on the predictions, wherein selecting one or more utterances from the set of utterances as corresponding to a problem statement based on the predictions comprises:
      filtering out one or more utterances from the set of utterances corresponding to the human agent, and
      identifying one or more user utterances from the set of utterances having a greater-than-a threshold probability of corresponding to a problem statement,
      wherein, in response to the identified user utterances exceeding k number of utterances, selecting the k utterances with the greatest probability of corresponding to a problem statement, wherein k is an integer greater than one; and
    providing the selected utterances to a downstream system for further processing.

17. A non-transitory computer-readable medium comprising a computer program, that, when executed by a computer system, enables the computer system to perform the following method for extracting utterances corresponding to a user problem statement in a conversation between a human agent and a user, wherein the user problem statement is extracted for purposes of downstream processing in a user-agent interaction system, the steps comprising:
  obtaining a set of utterances from a natural language conversation between a human agent and a user;
  using a problem-statement classifier to obtain machine-generated predictions as to whether each natural language utterance in the set of utterances relates to a problem statement;
  selecting one or more utterances from the set of utterances as corresponding to a problem statement based on the predictions, wherein selecting one or more utterances from the set of utterances as corresponding to a problem statement based on the predictions comprises:
    filtering out one or more utterances from the set of utterances corresponding to the human agent, and
    identifying one or more user utterances from the set of utterances having a greater-than-a threshold probability of corresponding to a problem statement,
    wherein, in response to the identified user utterances exceeding k number of utterances, selecting the k utterances with the greatest probability of corresponding to a problem statement, wherein k is an integer greater than one; and
  providing the selected utterances to a downstream system for further processing.

18. The non-transitory computer-readable medium of claim 17, wherein the problem statement classifier includes an encoder that creates an utterance embedding for each utterance and a prediction module that uses the utterance embeddings to predict whether each utterance corresponds to a user problem statement.

* * * * *